United States Patent Office 3,513,010

Patented May 19, 1970

3,513,010
CONVERSION FOIL

Norman T. Notley, New Orleans, La., assignor to Kalvar Corporation, New Orleans, La., a corporation of Louisiana No Drawing. Filed July 11, 1966, Ser. No. 563,995
Int. Cl. B32b 9/06; G03c 5/22
U.S. Cl. 117—11 7 Claims

ABSTRACT OF THE DISCLOSURE

A method of making a transparency having light transmitting and opaque areas by pressing against selected areas of an opaque sheet material. The opaque sheet material is a vesicular photographic material which has been exposed overall to light and developed, the developing film having been degassed.

The present invention relates to printing and more particularly to a process of clarifying an opaque sheet material or foil adapted to form a pattern of light-transmitting areas among opaque areas, by application of pressure and heat to localized areas of the foil.

A foil of this type is particularly useful for offset type printing in which offset plates are exposed to light through a transparency and then developed. In the past, the transparency has been made by photographing a printed proof sheet, using a camera and unexposed photographic film, e.g. conventional silver film, and then developing the film. The procedure required first setting type and then printing a proof before a photograph could be obtained.

In some cases, it has been possible to photograph the type and engraved plates themselves, and thus avoid the intermediate step of printing the proof, but this procedure nevertheless requires very special lighting equipment and cameras. When the type itself is to be photographed, it must be carefully cleaned by several laborious steps.

The present invention avoids these difficulties by the use of a sheet material or foil capable of forming an image suitable for preparing offset printing plates, when the type or engraved plates are pressed against it. No camera, lighting equipment or subsequent development is required, and the pressing operation can be carried out with a fairly simple printing press or proof press.

One form of pressure-sensitive foil previously has been made available by du Pont under the name "Cronapress." In this system, the type is first coated with an antistatic agent, a carefully dusted film is laid over the type, a vacuum is applied and then a pellet pressure device is placed over the film. The device contains over 5000 tiny metal balls each weighing about 0.01 oz., and these are vibrated. They strike the film, pressing it against the type by applying a momentary pressure of about 3 tons per square inch. The method is extremely sensitive to dust between the type and the film which causes the formation of dark spots surrounded by light halos. A further step is required to correct these. In addition, certain kinds of type cannot be used because of the risk of damage from the impact of the steel balls. One object of the present invention is to provide a film which avoids these difficulties, and, as noted above, elaborate pressing equipment of this nature is not required for the pressure sensitive foils of the present invention.

Another form of heat sensitive foil is described in U.S. Pat. No. 2,993,805, which utilizes essentially a sheet of vesicular photographic material which, after exposure to light of uniform intensity but before development, is contacted with metal type at a sufficiently elevated temperature to effect development of the film in the areas of contact. In other areas, no development takes place. This method has the practical disadvantage that the developed areas tend to spread beyond the area contacted by the hot type because heat from the type is transmitted through the material to adjacent exposed but undeveloped areas. The result may be a fuzzy appearance of type and is particularly a problem in half-tone reproductiton. The present invention is intended to provide a sheet or foil capable of receiving sharper impressions.

Yet another form of pressure sensitive foil is disclosed in copending U.S. patent application No. 434,694, now abandoned, in which a coating of plastic, containing an opacifying agent, on a flexible base, is rendered opaque by contact with an aqueous fluid, e.g. by immersing it in boiling water prior to use. The foil becomes pressure sensitive and upon contact under pressure with type becomes clear in the areas of pressure. This process, while an improvement over the prior art still has limitations, especially in the field of half-tone work.

The present invention provides a process especially useful for half-tone work in which conversion foil is contacted under pressure by heated type. The foil comprises a vesicular photographic material which has been exposed overall to substantially uniform actinic radiation and developed, for example by the application of heat, to produce a high uniform density. The vesicles in the areas of contact collapse, leaving those areas clear with respect to the rest of the foil which retains its density. The foil thus produced is useful for the same purposes as a standard conversion foil, but with the advantage of greater clarity in the clear areas, and better resolution.

A vesicular photographic material is a photographic film capable of forming an image with small bubbles or vesicles of gas which are generated and trapped in the areas of the film exposed to light. Generally speaking, the film comprises a colloid or resin coating, referred to as a vehicle, on a backing material and a light sensitive agent or sensitizer, most commonly a diazo compound, dispersed throughout the coating. When the film is exposed to light, the sensitizer is decomposed and releases molecules of gas (nitrogen in the case of diazo compounds). These ordinarily do not form vesicles immediately, but they do so when the film is heated, presumably because the vehicle is relaxed sufficiently on heating for the gas molecules to form bubbles and for the bubbles to expand. The bubbles reflect and scatter light and render the vehicle opaque to transmission of light in the exposed areas and they also appear white when viewed by reflected light.

In the present invention, an entire sheet of vesicular film is exposed to light of uniform intensity and developed. The aforesaid vesicles form throughout the vehicle and give a uniform opacity. Then, hot type is pressed against the sheet. In areas where the type presses into the sheet, the vesicles are collapsed and the sheet is cleared and becomes transparent. Other areas remain opaque.

In the vesicular sheet materials used, a wide variety of vehicles may be employed in accordance with the invention. Those preferred are dry, water-resistant, synthetic, water-insoluble, and non-water swelling polymers.

One class comprises esters, ethers and acetal derivatives of polyvinyl alcohol. The ester derivatives are generally obtained by polymerization of esters of vinyl alcohol with aliphatic or aromatic carboxylic acids. The aliphatic acids are preferred, the most suitable being lower fatty and unsaturated acids containing up to about six carbon atoms, such as acetic acid, propionic acid, valeric acid, vinyl acetic acid or crotonic acid. However, higher fatty acids such as octanoic may be used, particularly in combination with lower fatty acids. Suitable aromatic acids include benzoic acid, napthoic acids and phenyl acetic acid. The ester polymers may be obtained from the monomer by any conventional polymerization method, i.e., bulk, solution or aqueous emulsion or dispersion, in the presence of, e.g., a free radical or ionic catalyst, the details of which form no part of the present invention.

The ether derivatives similarly may be made by polymerization of vinyl ether monomer such as vinyl alkyl ethers. Preferred materials are vinyl lower alkyl ethers containing up to six carbon atoms in the alkyl group, such as vinyl methyl ether, vinyl propyl ether, etc. As in the case of the above-described vinyl esters, any type of addition polymerization may be employed, the details of which form no part of the present invention.

Polyvinyl acetals are generally made by reaction between aldehydes and polyvinyl alcohol or polyvinyl esters such as polyvinyl acetate. It is preferred that saturated lower aliphatic aldehydes be employed containing up to six carbon atoms, particularly butyraldehyde and formaldehyde. However, small amounts of higher aliphatic aldehydes or aromatic aldehydes such as benzaldehyde may be involved.

It will be appreciated that, while the above description of preferred polymers has been directed to homopolymers, copolymers containing more than one acetal, ester or ether group may be used. Thus, polyvinyl acetals may contain two or more types of acetal groups or, e.g., acetate units as well as acetal. In addition, relatively minor amounts of other ethylenically unsaturated monomers containing one or more

groups may be present in this class of preferred polymers, e.g., up to 5%, as long as the characteristics of the polymer are essentially not altered so as to render it unsuitable.

Vehicles of the aforesaid type are more fully described in Notley et al. applications Ser. Nos. 403,633 and 405,597 filed Oct. 13, 1964 and Oct. 21, 1964, respectively both now abandoned.

Any solid, high molecular weight polystyrene also may be used. In its preferred form, the polymer is a homopolymer or may contain minor amounts, e.g., up to 5% of other ethylenically unsaturated monomers such as methyl methacrylate. In most cases, larger amounts may be used, as long as the fundamental characteristics of the polymer are not altered so as to render it unsuitable.

Other preferred vehicles include those described in James U.S. Pat. 3,032,414, Parker et al. Pats. 3,161,511 and 3,251,690, Daech Pat. 3,189,455 and Notley et al. application Ser. No. 463,940 filed June 14, 1965 now Pat. No. 3,383,213, characterized by a permeability constant for nitrogen within the range $8.6\times10^{-16}$ and $8\times10^{-10}$, said constant being the number of cubic centimeters of nitrogen transmitted at 30° C. by an area of one square centimeter in one second when the pressure gradient is one centimeter of mercury. Such polymers include polyvinylidene chloride, polyvinyl chloride, copolymers of vinyl chloride and vinylidene chloride, vinyl chloride and acrylonitrile, styrene and acrylonitrile, acrylonitrile and 1,1-difluoroethylene, vinylidene chloride and acrylic acid, vinyl acetate and vinylidene cyanide, vinyl chloride and acrylic acid, vinyl chloride and methyl acrylate, vinylidene chloride and ethyl acrylate, vinylidene chlorofluoride and acrylonitrile, vinylidene chloride and methyl methacrylate, vinyl acetate and vinylidene chloride, vinyl alcohol and vinylidene chloride, vinyl chloride and diethyl maleate, and vinyl chloride and vinyl acetate, ethyl cellulose, copolymers of alkyl acrylates and methacrylates with acrylonitrile, polymers of methacrylonitrile, and nylons.

Still another useful class of vesicular materials are those containing gelatin or other hydrophilic polymers and a hardening agent, as described in Parker et al., U.S. Pat. 3,081,169.

The vehicles may also contain various modifiers of physical properties, as described in the above-listed patents and applications.

It will be appreciated that while numerous examples have been given, virtually any solid relatively rigid and inelastic plastic, and preferably thermoplastic, material may be used so long as it is sufficiently inelastic and rigid to retain the microscopic gas bubbles or cavities after they have formed. In some cases, softer polymers may be used if a mechanism is provided for hardening them after the vesicles are formed. However, in view of the large number of polymeric materials which are highly satisfactory, the use of such softer materials is regarded for the most part as unnecessary.

The above polymers are substantially uniformly blended with a light decomposable agent, or sensitizer, of the types which are known in the art of vesicular photographic materials which, upon exposure to light, decompose into products which are volatile upon warming to form the above-described radiation scattering cavities. The preferred sensitizers are non-reactive to the vehicle and, upon exposure to light, decompose into products which are chemically non-reactive to said vehicle and which are volatile to form radiation scattering discontinuities only in the light struck areas in said vehicle to thereby furnish a record. Of these preferred sensitizers, those which are especially useful are of the type which decompose to release nitrogen on exposure to light, particularly the diazonium salts. Suitable sensitizers include the diazo compounds which release nitrogen on exposure to light, as disclosed in U.S. Pats. 3,032,414, 2,923,703 and 2,976,145, for example, p-diazo diphenylamine sulfate, p-diazo diethylaniline zinc chloride, p-diazo ethyl hydroxyethylaniline zinc chloride, p-diazo ethyl methyl aniline zinc chloride, p-diazo diethyl methyl aniline zinc chloride, p-diazo ethyl hydroxyethylaniline zinc chloride, 1-diazo-2-oxy naphthaline-4-sulfonate, p-diethyl amino benzene diazonium chloride $ZnCl_2$, 4-benzolamino-2-5-diethoxy benzene diazonium chloride, p-chlorobenzene-sulfonate of 4-diazo-1-cyclohexylaniline, p-chlorobenzene-sulfonate of 4-diazo-2-methoxy-1-cyclohexylamino benzene, tin chloride double salt of 4-N-methylcyclohexyl-amino-benzene diazonium chloride, p-acetamino benzene diazonium chloride, 4-dimethylamino benzene diazonium chloride, 3-methyl-4-diethyl amino benzene diazonium chloride, 4-morpholino benzene diazonium chloride, 4-piperidyl-2,5-diethoxy benzene diazonium chloride, 1-dimethyl amino naphthaline-4-diazonium chloride, 4-phenyl amino diazo benzene diazonium chloride. Other useful sensitizers are those disclosed in British specification 956,336 published Apr. 22, 1964, and having the general formula

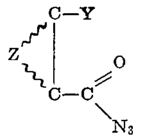

in which Y represents hydroxyl, amino, alkylamine, arylamine, or mercapto and Z represents the atoms necessary to form a cyclic structure, and those disclosed in French Pat. 1,281,905 having the general structure

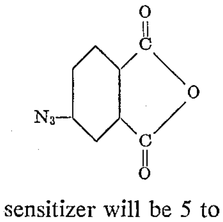

The amount of sensitizer will be 5 to 20 percent, based on the weight of the vehicle, preferably 10 to 16%.

The vehicle also may contain a relatively small amount of a light-absorbing pigment or dye such as azo oil black. This improves image contrast. The quantity of dye is insufficient to render the foil opaque in the areas which are cleared by application of pressure. However, in the areas which are not cleared, there are numerous light-scattering centers which cause light to take an irregular path through the foil. As a result, the distance which light rays travel through the foil is many times the thickness of the film, while in the cleared areas the light path is the same as the thickness of the foil. The amount of light transmitted through the foil is given by the equation $$I=I_0e^{-ax}$$

where I is the intensity of the transmitted light, $I_0$ is the intensity of light incident on the foil, $a$ is a constant known as the absorption coefficient which is proportional to the concentration of the pigment or dye and also depends on the nature of the pigment or dye and $x$ is the path length. The ratio of light transmitted in the cleared areas to that transmitted in the uncleared areas is given by $$\frac{I_c}{I_u}=e^{a(x_u-x_c)}$$

where $x_u$ is the effective path length in the uncleared area and $x_c$ is the foil thickness. It can be seen that the absorption of light by the pigment or dye in the opaque areas is greatly magnified by the light scattering centers and that very high contrast is achieved. This is of course in addition to the opaqueness difference caused by the light scattering centers themselves. The amount of light-absorbing dye is less than about 5%, preferably 0.2–3%, based on the weight of the resin.

For one of the principal intended uses of the foil, the light absorbing material may not have to absorb visible light. That is, the processed foil may be employed as a transparency for exposing an offset printing plate. This may use ultraviolet light so that a UV absorber which is transparent to visible light is quite suitable, for example Du Pont's Uvinul 400.

The vehicle and the sensitizer, as well as pigment or dye if used, may be combined by any suitable method. However, it is preferred that the resin and sensitizer, and preferably also the pigment or dye each be dissolved in a solvent and the resultant solutions combined, since this provides a highly uniform distribution of sensitizer in the polymer. In this embodiment it is only necessary that the respective solvents be mutually miscible. For the most part, polar solvents will be used such as alcohols, ketones, nitriles, esters, ethers and halogenated solvents. Particularly useful are methyl, ethyl and isopropyl alcohols, alkyl acetates, acetone, methyl ethyl ketone, dioxane and acetonitrile. However, any inert solvent which meets the above miscibility requirements may be used.

The solution obtained is coated on any suitable backing layer, either transparent or opaque, such as glass, paper, Mylar (oriented polyethylene terephthalate film), polyethylene film or polypropylene film as disclosed in U.S. Pats. 2,950,194 and 3,037,862. The solutions are dried by evaporation and the films are ready for use. The dry coating thickness is about .05 to .9 mil, preferably .3 to .7 mil.

After the coating is dried, the foil is prepared for use by uniform exposure and development. The exposure is to light having a wavelength to which the sensitizer responds. In the case of diazo compounds, the light may be in the near ultraviolet, for example 400 millimicrons. The intensity and time of exposure are sufficient to decompose an adequate part of the sensitizer. The exact exposure time may vary with the concentration of sensitizer in the vehicle, the conditions of development, etc. However, the correct exposure is readily computed by conventional sensitometry techniques, and overexposure is not objectionable. The exposure should be sufficient to produce a printing diffuse density higher than 1.0 and preferably higher than 1.9.

The light used to expose the foil overall preferably should be very uniform. However, since the film ordinarily is overexposed, variations from one portion to another may be tolerated provided that each portion is fully exposed to produce a density of at least 1.0. For example, the center of the exposed area may receive higher intensity than the edges provided the edges are fully exposed.

After exposure, the film is developed by heating in the known manner. For ordinary materials, the development will be in the range 160–300° F. for 0.1 to 3 seconds. However, in some cases, the development may be omitted if the light is of high intensity, as in the second exposure described in U.S. application of Notley et al., 383,169 filed July 16, 1964 now abandoned. Generally, if the film is exposed to light of sufficient intensity to produce normal density in less than 0.2 second, preferably less than 0.01 second, vesicles will form immediately without a separate development step.

The developed film is stored to permit degassing. That is, as formed, the vesicles may contain gas under pressure. This gas gradually diffuses, and exchanges with the atmosphere to equalize pressure and change the gas composition to the same as the atmosphere. The step of degassing preferably should be carried out before the foil is used with type. Ordinarily this requires storing the foil at room temperature for ½ day or more. Long storage is not harmful.

The foil is used by depressing points or small areas of the opaque coating. When this is done, the coating is restored to its original clear state in the depressed areas. The amount of pressure required ranges from the normal writing pressure applied to a pencil or to a ballpoint pen up to the pressures capable of indenting Mylar. The pressure required may be reduced by raising the temperature of the pressure applicator. It has been found that pressure required to deform the material is related to the temperature of the pressure applying element by an exponential function such that the pressure required decreases as the temperature is raised. A maximum pressure is required for temperatures up to 150° F. Above this temperature progressively lesser pressures are required for clearing as the temperature is increased.

A particularly important use is in preparing offset printing plates. For example in preparing offset printing plates by assembling a page of raised metal type and/or half-tone plates, the type is heated in an oven to about 200 to 350° F. preferably 220°–280° F. The type is then compressed against the pressure sensitive sheet material in a proof press. The opaque sheet becomes clear in the areas corresponding to the raised metal-type and half-tone dots but remains opaque in other areas. It then is available as a transparency for the making of the offset plate.

An important advantage of the present invention is associated with the uniformity of the size of the vesicles and uniform distribution of vesicles throughout the product. This is because image sharpness depends on collapsing only vesicles immediately under the type and not in adjoining areas. A little pressure always is spread to adjoining areas, albeit less than immediately under the type. Consequently, the pressure which spreads should not be sufficient to collapse voids.

If the voids are of uniform size, approximately the same amount of pressure is required (at any given temperature) to collapse each void in the film. If the size varies, the amount of pressure will be varied and obviously the pressure applied under the type must be sufficient to collapse the most resistant vesicles and in excess of that required for the vesicles which are easy to collapse. The pressure which spreads to adjoining areas, while less than that under the type, and insufficient to collapse the most difficult vesicles, may be sufficient to collapse the weaker vesicles producing a partial clearing and reduced density in the adjoining areas. This reduces image sharpness. On the other hand, if the vesicles are of uniform size, about the same pressure is required to collapse all of them and the pressure under the type need exceed this requirement by only a little. The pressure which spreads to adjoining areas will be less, and insufficient to collapse the vesicles in those areas. Therefore image sharpness is increased.

In vesicular films, exposed to light of uniform intensity and developed by uniform heat, all, or substantially all, of the vesicles, i.e. at least 99%, are in the range 0.1 micron to 1 mil (25.4 microns) preferably 0.1 to 10 microns. Within this range, at least 90% of the voids vary by at most a factor of three from the mean diameter, preferably by a factor of two. Thus, if the mean diameter is 1 micron, 90% of the voids are in the range 0.33 to 3 microns, preferably 0.5 to 2 microns.

The following examples, illustrate the invention, all parts and percentages being by weight unless otherwise indicated.

Example 1

The following were assembled:

| Solution A: | Parts by weight |
|---|---|
| Vinylidene chloride acrylonitrile copolymer [1] | 100 |
| Polymethylmethacrylate | 12 |
| Methylethylketone (MEK) | 350 |
| Azo oil blue-black | 1.5 |
| **Solution B:** | |
| p-Diazo N,N dimethylaniline 1/1 zinc chloride | 15 |
| Methanol | 105 |

[1] Saran F–120.

The vinylidene chloride acrylonitrile copolymer, the polymethylmethacrylate and the Azo oil blue-black were added to the MEK and the solution was ball-milled until the polymer was dissolved to form solution A. The methanol was warmed to 50° C. and the diazo was dissolved therein to form solution B. Solution B was mixed into solution A and coated on a sheet of 5 mil polyester base with a vacuum plate and a laboratory coating knife at a thickness of 0.5 mil. The sheet was dried in a 140° F. oven for five minutes and cured in a 240° F. oven for five minutes. The sheet was then exposed to uniform radiation from a 400 watt mercury arc lamp for 100 seconds at a distance of 12 inches from the sheet and developed by contact with a hot roller at 260° F. for two seconds. After allowing a sufficient time to lapse to permit degassing, the film was then mounted on a standard proof press and passed against the metal type or form which had been heated to 220°–280° F. The result was substantial clearing of the areas which had contacted the hot type and retention of uniform density in the other areas.

Example 2

A sample produced as in Example one and exposed and developed as in Example one was allowed to degas and then was mounted on a standard proof press and passed in the normal manner over a metal half-tone form which had been heated to 220°–280° F. The result was substantial clearing of the areas which had contacted the hot form and retention of uniform density in the other areas. The conversion showed sharp definition of the dots with little spreading and good transparency in the clear areas.

Example 3

25 gms. of formaldehyde polyvinyl acetal of composition, 82% acetal content, 9.5–13.0% acetate content, and 5.0–6% hydroxyl content and 0.5 gm. azo oil blue-black were dissolved in 200 gms. of 1,4-dioxane to produce a solution A. A separate solution B was made from 2.7 gms. of p-diazo N,N-dimethyl aniline boro-fluoride salt, 64 gms. of methanol and 20 gms. of distilled $H_2O$. The two solutions were mixed thoroughly and were then coated onto a Mylar backing by means of a Gardner film coating knife and a Bird vacuum plate at a thickness of 0.5 mil. The film was then exposed to a flash lamp (General Electric 200 watt second and within a polished reflector), the film being at the edge of the reflector and about 3 inches from the flash tube, the flash duration being 1/4500 second.) The film then had a uniform projection density of about 2.7 and, after degassing, was used with hot type and metal half tone as described in Examples 1 and 2.

Example 4

3½ grams of the dried copolymer produced according to Example 1 of U.S. Pat. 3,251,690 was added with stirring to 25 ml. of acetonitrile. Gentle heating was necessary to dissolve the last portion. The resulting solution was allowed to cool to room temperature. Then, as stirring continued, 4½ ml. of methyl alcohol containing 0.314 gram of p-dimethyl amino diazonium zinc chloride (heated slightly to complete solution) was slowly added to the acetonitrile solution. When the mixture was uniform, it was poured out onto a Mylar film backing and spread to form a thin, uniform coating. Solvent was removed by placing in an oven at 110 to 115° C. for 30 minutes. The film was then exposed to a mercury vapor lamp and developed for 3 seconds at approximately 250° F. The product used after degassing was ready to be used with hot type and half tones as in Examples 1 and 2.

Example 5

Two separate solutions were prepared from the following materials:

| Solution A: | Parts by weight |
|---|---|
| Versamid No. 900 [1] | 25 |
| Isopropyl alcohol | 80 |

[1] A polyamide of ethylene diamine and dimerized linoleic acid having the following properties: Viscosity at 25° C. (Gardner-Holt) A-C (25% solution in butanol-phenol—1:1). Color 12 max. (25% solution in butanol-phenol—1:1). Acid number approximately 7, ash, 0.10% by weight max., specific gravity 0.98, pounds per gallon 8.2, penetration at 25° C. (A.S.T.M. 200 g. weight) approx. 2, Ball and ring softening point 180–190, average molecular weight 6000–9000.

| Solution B: | Parts by weight |
|---|---|
| N,N-dimethyl amino benzene diazonium chloride zinc chloride salt | 2 |
| Methyl alcohol | 40 |

The solutions were combined and the mixture was coated on a backing of Mylar (oriented polyethylene terephthalate film) and then dried for 5 minutes in an oven which was maintained at 140° F. After exposure uniformly to light from a 200 watt-second flash unit and degassing, the film is ready for use with hot type and metal half tone as in Examples 1 and 2.

It will be appreciated that various changes may be made in details of formulation and the method of making and using the foil, without departing from the real scope of the invention, as defined in the appended claims.

I claim:

1. In a method of producing a transparency having light transmitting and opaque areas which comprise selectively applying pressure to portions of a pressure sensitive foil having voids, the pressure applied being sufficient to render the depressed areas of said foil non-opaque, the improvement in which at least 99% of the voids in said foil are in the range 0.1 micron to 1 mil and at least 90% of the voids vary at most by a factor of three from the mean diameter, said foil being obtained by uniformly exposing a vesicular photographic material overall to actinic light, said material comprising a polymeric vehicle having a sensitizer, which releases gas upon exposure to actinic light, uniformly dispersed throughout said vehicle, developing the vesicular material to form vesicles throughout the said vehicle and degassing the vesicular material.

2. A method as set forth in claim 1 wherein the pressure sensitive foil comprises a transparent backing layer having coated thereon a layer of exposed and developed vesicular photographic material containing said voids, the coating thickness being 0.05 to 0.9 mil, and the foil having a printing diffuse density higher than 1.0.

3. A method as set forth in claim 2 wherein the coating thickness is 0.3 to 0.7 mil and the printing diffuse density is higher than 1.9.

4. In a method of producing a transparency having light transmitting and opaque areas which comprise selectively applying pressure to portions of a pressure sensitive foil having voids, the pressure applied being sufficient to render the depressed areas of said foil non-opaque, the improvement in which at least 99% of the voids in said foil are in the range 0.1 to 10 microns and at least 90% of the voids vary at most by a factor of two from the mean diameter, said foil being obtained by exposing a vesicular photographic material overall to light, developing the vesicular material and degassing the vesicular material.

5. A method as set forth in claim 1 in which pressure is applied by heated type or half tone form.

6. A method as set forth in claim 5 in which the temperature of said heated metal type or half tone form is above about 150° F.

7. A method as set forth in claim 6 in which said temperature is about 200 to 350° F.

References Cited

UNITED STATES PATENTS

| | | | |
|---|---|---|---|
| 2,680,062 | 6/1954 | Sus | 96—49 |
| 2,739,909 | 3/1956 | Rosenthal | 117—36.7 |
| 2,846,727 | 8/1958 | Bechtold | 117—36.7 XR |
| 2,911,299 | 11/1959 | Baril et al. | 96—75 XR |
| 2,993,805 | 7/1961 | Kay | 96—27 XR |
| 3,171,744 | 3/1965 | Peticolas | 96—48 XR |
| 3,145,117 | 8/1964 | Katchalsky et al. | 117—36.7 |
| 3,272,629 | 9/1966 | Hills | 96—49 XR |

NORMAN G. TORCHIN, Primary Examiner

C. BOWERS, Assistant Examiner

U.S. Cl. X.R.

96—49, 27; 117—37, 65.2, 38.62